United States Patent
Fukami (10) Patent No.: US 10,001,118 B2
(45) Date of Patent: Jun. 19, 2018

(54) RAPID-DISCHARGE-VALVE STRUCTURAL BODY AND DIAPHRAGM PUMP

(71) Applicant: Okenseiko Co., Ltd., Tokyo (JP)

(72) Inventor: Tadashi Fukami, Tokyo (JP)

(73) Assignee: OKENSEIKO CO., LTD., Tokyo (JP)

( * ) Notice: Subject to any disclaimer, the term of this patent is extended or adjusted under 35 U.S.C. 154(b) by 253 days.

(21) Appl. No.: 14/895,913

(22) PCT Filed: Dec. 27, 2013

(86) PCT No.: PCT/JP2013/085106
§ 371 (c)(1),
(2) Date: Dec. 3, 2015

(87) PCT Pub. No.: WO2014/196102
PCT Pub. Date: Dec. 11, 2014

(65) Prior Publication Data
US 2016/0123315 A1    May 5, 2016

(30) Foreign Application Priority Data

Jun. 6, 2013 (JP) .................................. 2013-120084

(51) Int. Cl.
*F04B 43/02* (2006.01)
*F04B 53/10* (2006.01)
(Continued)

(52) U.S. Cl.
CPC .............. *F04B 43/02* (2013.01); *F04B 39/10* (2013.01); *F04B 45/04* (2013.01); *F04B 53/04* (2013.01);
(Continued)

(58) Field of Classification Search
CPC ...... F04B 53/107; F04B 45/04; F04B 45/043; F04B 45/045; F04B 45/047; F04B 43/02; F04B 43/04; F04B 43/025; F04B 43/026; F04B 43/0045; F04B 43/0081; F04B 49/22; F04B 49/03; F04B 39/10; F04B 39/08; F04B 39/0055; F04B 39/0061;
(Continued)

(56) References Cited

U.S. PATENT DOCUMENTS

| 2005/0047940 A1* | 3/2005 | Nawa .................. A61B 5/02141 417/413.1 |
| 2006/0237076 A1* | 10/2006 | Fangmeier ............ F16K 15/145 137/853 |
| 2011/0079291 A1 | 4/2011 | Blin et al. |

FOREIGN PATENT DOCUMENTS

| JP | 61115534 | 6/1986 |
| JP | H02-154738 A | 6/1990 |

(Continued)

OTHER PUBLICATIONS

Search Report in European Application No. 13886323.8 dated Jan. 17, 2017. 10 pages.

*Primary Examiner* — Charles Freay
*Assistant Examiner* — Christopher Brunjes
(74) *Attorney, Agent, or Firm* — Womble Bond Dickinson (US) LLP (57) ABSTRACT

A rapid-discharge-valve structural body (2) allows air to flow from an input-side space (9A) to an output-side space (9B) in accordance with the flow rate of air to be supplied to a supply passage (101). Accordingly, the flow rate of air to be discharged from a discharge passage (113) also changes. As a consequence, flow rate peaking can be prevented.

6 Claims, 5 Drawing Sheets

(51) Int. Cl.
  *F16K 15/06* (2006.01)
  *F04B 53/04* (2006.01)
  *F04B 39/10* (2006.01)
  *F04B 45/04* (2006.01)

(52) U.S. Cl.
  CPC ........ *F04B 53/106* (2013.01); *F04B 53/1062* (2013.01); *F04B 53/1067* (2013.01); *F16K 15/063* (2013.01)

(58) Field of Classification Search
  CPC ...... F04B 39/123; F04B 39/12; F04B 39/121; F04B 39/125; F04B 41/02; F04B 23/02; F04B 11/0008; F04B 53/16; F04B 53/007; F04B 53/105; F04B 53/1052; F04B 53/1055; F04B 53/1062
  See application file for complete search history.

(56) References Cited

FOREIGN PATENT DOCUMENTS

| | | | |
|---|---|---|---|
| JP | 2004-316525 A | | 11/2004 |
| JP | 2011-127470 A | | 6/2011 |
| JP | 2012-172577 A | | 9/2012 |
| JP | 2012-172747 A | | 9/2012 |
| JP | 2012172577 A | * | 9/2012 |

* cited by examiner

FIG. 6

RAPID-DISCHARGE-VALVE STRUCTURAL BODY AND DIAPHRAGM PUMP

TECHNICAL FIELD

The present invention relates to a rapid-discharge-valve structural body and diaphragm pump and, more particularly, to a rapid-discharge-valve structural body which decreases a pressure to an object to be pressurized when the supply of a gas to the object to be pressurized is stopped, and a diaphragm pump including this rapid-discharge-valve structural body.

BACKGROUND ART

Figure 5:
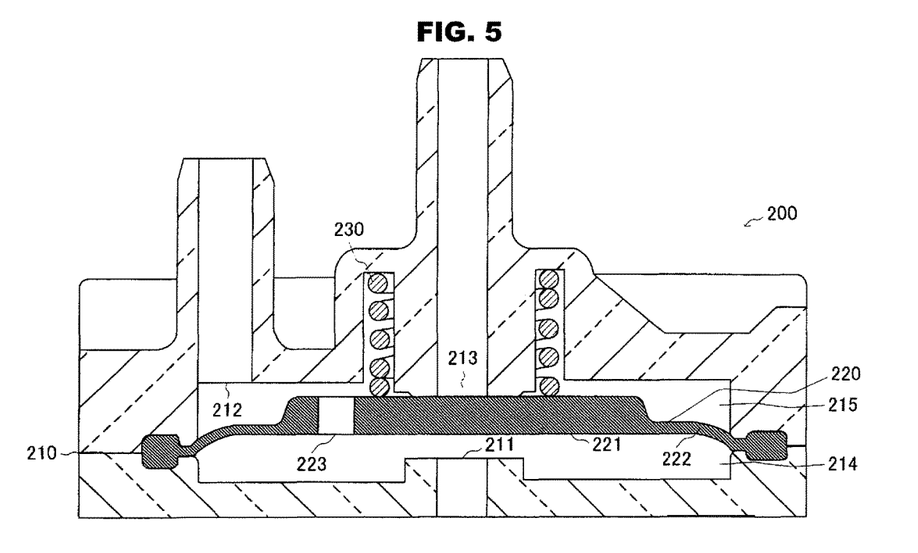
FIG. 5 is a sectional view of a conventional rapid-discharge-valve structural body.

Conventionally, a diaphragm pump including a rapid-discharge-valve structural body is used to supply a pressurized gas to an object to be pressurized such as a hot water heater or sphygmomanometer. In the diaphragm pump of this kind, the rapid-discharge-valve structural body is installed in the discharge port of the diaphragm pump. As described in patent literature 1, when the diaphragm pump stops after pressurized air is supplied to an object to be pressurized, the rapid-discharge-valve structural body instantaneously decreases the pressure remaining in the object to be pressurized to the atmospheric pressure. FIG. 5 shows an example of this rapid-discharge-valve structural body.

A rapid-discharge-valve structural body 200 shown in FIG. 5 includes a vessel 210, a valve body 220 formed in the vessel 210, and a spring 230 for biasing the valve body 220.

The vessel 210 includes a supply port 211 to which air is supplied, a discharge port 212 for supplying air to an object to be pressurized, and an exhaust port 213 for exhausting air from the vessel 210. The valve body 220 is formed in the vessel 210, and partitions the internal space of the vessel 210 into an input-side space 214 connected to the supply port 211, and an output-side space 215 connected to the discharge port 212 and exhaust port 213. The valve body 220 includes a valve main body 221 for selectively closing the supply port 211 and exhaust port 213, a support portion 222 for supporting the valve main body 221, and a communication passage 223 for allowing the input-side space 214 and output-side space 215 to communicate with each other. The spring 230 biases the valve main body 221 toward the supply port 211.

In the rapid-discharge-valve structural body 200 configured as described above, when air is supplied from a pump chamber of the diaphragm pump to the supply port 211, air pushes up the valve main body 221 closing the supply port 211, and enters the output-side space 215 from the input-side space 214 through the communication passage 223. In this state, a pressure loss is generated because air flows through the communication passage 223, and the internal pressure of the input-side space 214 becomes higher than that of the output-side space 215. When the difference between the pressure of the input-side space 214 and that of the output-side space 215 becomes higher than the resilient force of the spring 230, the valve main body 221 closes the exhaust port 213, thereby disconnecting the discharge port 212 and exhaust port 213. Accordingly, air supplied to the supply port 211 is supplied from the discharge port 212 to the object to be pressurized.

On the other hand, when the supply of air to the supply port 211 is stopped by stopping the diaphragm pump, the communication passage 223 decreases the difference between the internal pressure of the input-side space 214 and that of the output-side space 215. Consequently, the resilient force of the spring 230 pushes down the valve main body 221 toward the supply port 211, thereby connecting the discharge port 212 and exhaust port 213. Therefore, the internal pressure of the output-side space 215 connected to the object to be pressurized through the discharge port 212 becomes the atmospheric pressure.

RELATED ART LITERATURE

Patent Literature
   Patent Literature 1: Japanese Patent Laid-Open No. 2012-172577

DISCLOSURE OF INVENTION

Problem to be Solved by the Invention

Figure 6:
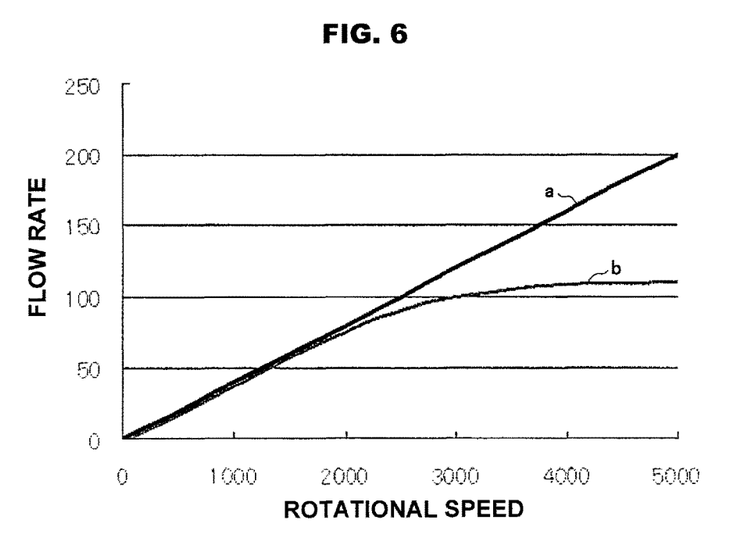
FIG. 6 is a graph showing the relationship between the rotational speed of a motor of a conventional diaphragm pump and the flow rate of air to be discharged from a discharge port of the rapid-discharge-valve structural body.

In the rapid-discharge-valve structural body 200 described above, however, the size of the communication passage 223 formed in the valve main body 221 is constant, so the flow rate of air capable of passing through the communication passage 223 is limited. As shown in FIG. 6, even when the rotational speed (symbol a) of the motor of the diaphragm pump was increased, the flow rate (symbol b) reached its peak (did not exceed a predetermined value).

It is an object of the present invention to provide a rapid-discharge-valve structural body and diaphragm pump capable of preventing flow rate peaking.

Means of Solution to the Problem

To solve the problem as described above, a rapid-discharge-valve structural body according to the present invention comprises a vessel including a supply passage through which a gas is supplied from the outside, a discharge passage configured to discharge the gas to an object to be pressurized, and an exhaust port configured to exhaust an internal gas outside, a rapid discharge valve installed in the vessel, and including an exhaust port valve body configured to partition an internal space of the vessel into an input-side space including the supply passage and an output-side space including the discharge passage and the exhaust port, and close the exhaust port when a gas is supplied through the supply passage into the input-side space, a communication passage configured to allow the input-side space and the output-side space to communicate with each other, and a flow rate controller configured to, when a gas is supplied through the supply passage into the input-side space, allow the gas to flow from the input-side space to the output-side space in accordance with a flow rate of the gas to be supplied to the supply passage, and, when no gas is supplied through the supply passage into the input-side space, prevent a flow of a gas from the input-side space to the output-side space.

Also, a diaphragm pump according to the present invention comprises a pump chamber formed by a diaphragm including a diaphragm portion, a diaphragm holder configured to hold the diaphragm, a partition arranged on the diaphragm holder, a rapid-discharge-valve structural body arranged on the partition, and a driving mechanism configured to expand and contract the pump chamber by deforming the diaphragm portion, wherein the partition includes a suction passage configured to allow the pump chamber to suck a gas, and an output passage configured to output a gas from the pump chamber, the diaphragm holder, the partition, and the rapid-discharge-valve structural body are integrated in a stacked state, a gas output through the output passage is supplied to the supply passage, and the rapid-discharge-valve structural body comprises a vessel including a supply passage through which a gas is supplied from the outside, a discharge passage configured to discharge the gas to an object to be pressurized, and an exhaust port configured to exhaust an internal gas outside, a rapid discharge valve installed in the vessel, and including an exhaust port valve body configured to partition an internal space of the vessel into an input-side space including the supply passage and an output-side space including the discharge passage and the exhaust port, and close the exhaust port when a gas is supplied through the supply passage into the input-side space, a communication passage configured to allow the input-side space and the output-side space to communicate with each other, and a flow rate controller configured to, when a gas is supplied through the supply passage into the input-side space, allow the gas to flow from the input-side space to the output-side space in accordance with a flow rate of the gas to be supplied to the supply passage, and, when no gas is supplied through the supply passage into the input-side space, prevent a flow of a gas from the input-side space to the output-side space.

Effect of the Invention

In the present invention, a gas flows from the input-side space to the output-side space in accordance with the flow rate of a gas to be supplied to the supply passage. Accordingly, the flow rate of a gas to be discharged from the discharge passage also changes, and as a consequence flow rate peaking can be prevented.

BEST MODE FOR CARRYING OUT THE INVENTION

Figure 1:
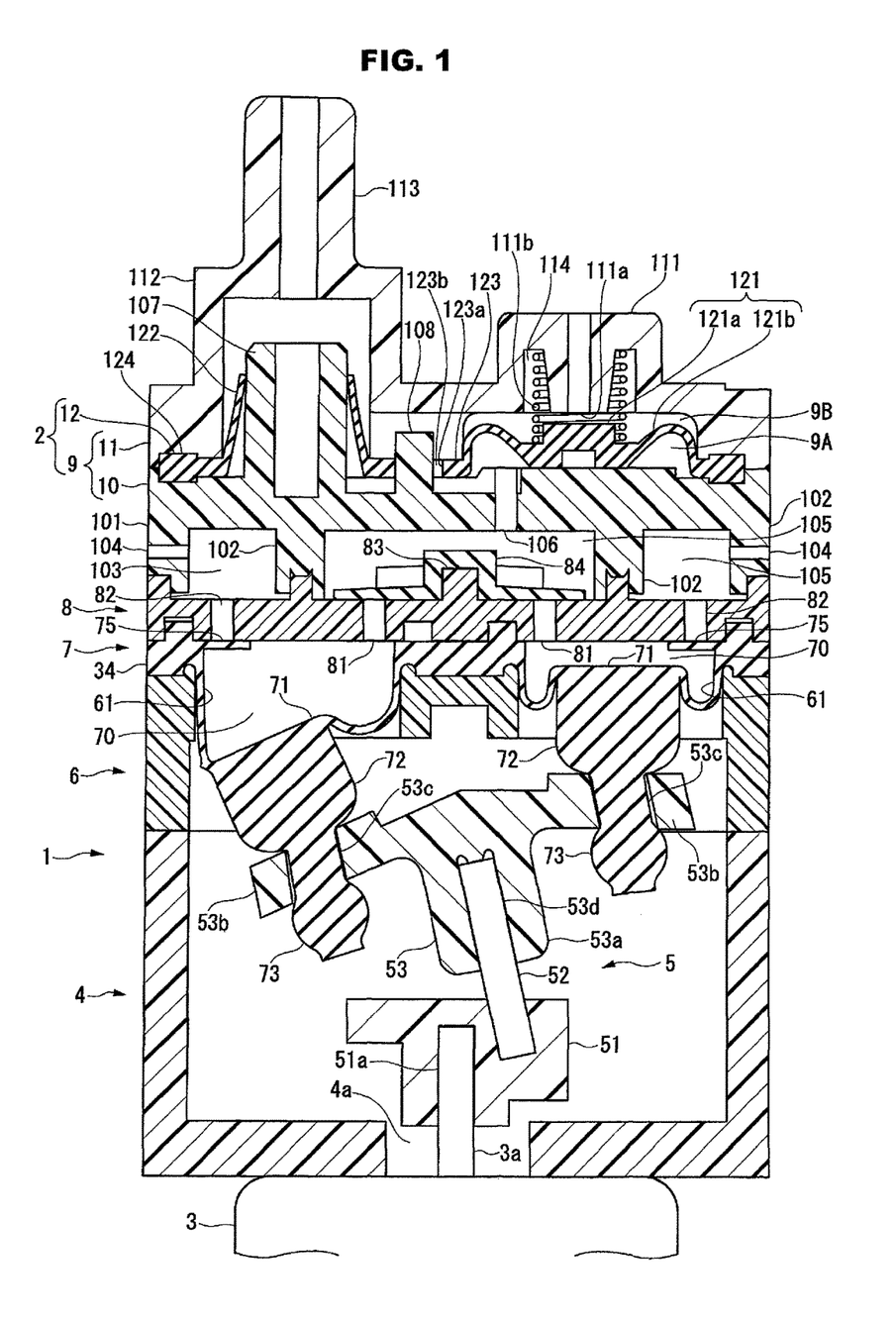
FIG. 1 is a sectional view of a diaphragm pump according to the first embodiment of the present invention.

The present invention will be explained in detail below with reference to the accompanying drawings.
<Arrangement of Diaphragm Pump>
As shown in FIG. 1, a diaphragm pump according to the first embodiment includes a diaphragm pump main body 1 and rapid-discharge-valve structural body 2.
<Arrangement of Diaphragm Pump Main Body>
The diaphragm pump main body 1 includes a motor 3, a case 4 to which the motor 3 is fixed, a driving mechanism 5 accommodated in the case 4, a diaphragm holder 6 arranged on the case 4, a diaphragm 7 held by the diaphragm holder 6, and a partition 8 arranged on the diaphragm holder 6.

The case 4 is a closed-end cylindrical member made of, e.g., a resin. The upper portion of the case 4 is open, and the motor 3 is fixed to the outside of the bottom portion having an almost square shape in a planar view. An output shaft 3a of the motor 3 is inserted into the case 4 from a hole 4a formed in the bottom portion of the case 4.

The driving mechanism 5 includes a crank base 51 fixed to the output shaft 3a of the motor 3, a driving shaft 52 having one end portion fixed to the crank base 51, and a driving body 53 to which the other end portion of the driving shaft 52 is axially attached.

The crank base 51 is an almost columnar member made of, e.g., a resin. A hole 51a into which the output shaft 3a of the motor 3 pressed is formed in a central portion of the bottom surface of the crank base 51. A hole 51b for fixing one end portion of the driving shaft 52 is formed in a position apart from a central portion of the upper surface of the crank base 51.

One end portion of the driving shaft 52 is fixed in the hole 51b with the crank base 51 being fixed to the output shaft 3a of the motor 3. The driving shaft 52 inclines to the output shaft 3a, and rotatably pivotally supports the driving body 53.

The driving body 53 is a member made of, e.g., a resin, and includes a pair of driving members 53b extending from one end portion of a columnar base 53a in a direction perpendicular to the axis of the base 53a. The other end portion of the driving shaft 52a of the driving body 53 is inserted into a hole 53c formed in the bottom surface of the base 53a, and a projection 74 integrated with a piston 73 of the diaphragm 7 (to be described later) is locked by a locking hole 53d formed in the driving member 53b. When the output shaft 3a rotates by driving by the motor 3, therefore, the driving shaft 52 rotates in the inclined state together with the crank base 51, and the pair of driving members 53b of the driving body 53 and the pistons 73 locked by the driving members 53b reciprocate in the vertical direction in FIG. 1. Thus, the driving mechanism 5 converts the rotation of the motor 3 into the vertical reciprocating motion of the pistons 73.

The diaphragm holder 6 is a closed-end cylindrical member made of, e.g., a resin. In the top plate of the diaphragm holder 6, a pair of holding holes 61 spaced apart at an interval of 180° in the circumferential direction in a planar view are formed. Diaphragm portions 71 of the diaphragm 7 (to be described below) are held by the pair of holding holes 61.

The diaphragm 7 is formed by a flexible material such as rubber. The diaphragm 7 is integrated with the two semi-spherical diaphragm portions 71 spaced apart at an internal of 180° in the circumferential direction in a planar view, and a flange 72 which has an almost square shape in a planar view and connects the upper end portions of the two diaphragm portions 71. The piston 73 is formed at the apex of each diaphragm portion 71, and the projection 74 to be locked is integrated with one end of each piston 73. A suction valve body 75 integrated with the diaphragm 7 horizontally projects from a part of the open end portion of each diaphragm portion 71.

The diaphragm 7 configured as described above is held by the diaphragm holder 6 by inserting the diaphragm portions 71 into the holding holes 61, and pressing the projections 74 of the diaphragm portions 71 into the locking holes 53d of the driving bodies 53 while elastically deforming the projections 74. The diaphragm holder 6 thus holding the diaphragm 7 is placed on the upper open end of the case 4.

The partition 8 is a plate-like member made of a resin or the like and having an almost square shape in a planar view. The partition 8 is placed on the top plate of the diaphragm holder 6 so as to sandwich the diaphragm 7 together with the diaphragm holder 6. Thus, the partition 8 forms a pump chamber 70 together with each diaphragm portion 71 of the diaphragm 7.

An output passage 81 for allowing each pump chamber 70 to communicate with a supply space 105 (to be described later) is formed in an almost central portion of the partition 8. A suction passage 82 for allowing each pump chamber 70 to communicate with a suction space 103 (to be described later) is formed near the periphery of the partition 8. The suction valve body 75 is positioned in the lower end portion of the suction passage 82. The suction valve body 75 regulates a backflow from the pump chamber 70 to the suction passage 82. A projection 83 stands on a central portion of the upper surface of the partition 8. A discharge valve body 84 for closing the upper end of the output passage 81 and regulating a backflow of air through the output passage 81 to the pump chamber 70 is attached to the projection 83.

<Arrangement of Rapid-Discharge-Valve Structural Body>

The rapid-discharge-valve structural body 2 includes a vessel 9 including a lower housing 10 and upper housing 11, and a rapid discharge valve 12 installed in the vessel 9 so as to be sandwiched between the lower housing 10 and upper housing 11. The rapid discharge valve 12 partitions the internal space of the vessel 9 into an input-side space 9A on the side of the lower housing 10, and an output-side space 9B on the side of the upper housing 11.

The lower housing 10 is a plate-like member made of a resin or the like and having an almost square shape in a planar view. A cylindrical sidewall 101 stands on the outer periphery of the lower surface of the lower housing 10, and a cylindrical partition 102 stands on a central portion of the lower surface of the lower housing 10.

The lower housing 10 is placed on the partition 8, and the lower surface of the lower housing 10, the sidewall 101, and the partition 102 form the suction space 103 in cooperation with the upper surface of the partition 8. The suction space 103 communicates with the outside through an inlet passage 104 formed in the sidewall 101. The lower surface of the lower housing 10 and the partition 102 form the supply space 105 in cooperation with the upper surface of the partition 8. The supply space 105 communicates with the input-side space 9A through a supply passage 106 formed in the central portion of the lower housing 10.

On the upper surface of the lower housing 10, a cylindrical check valve seat 107 stands in a position apart from the supply passage 106. A columnar projection 108 stands between the check valve seat 107 and supply passage 106.

The upper housing 11 is a closed-end cylindrical member made of, e.g., a resin. The lower surface of the upper housing 11 is open, and an exhaust cylinder 111 having an exhaust port 111a open to the atmosphere stands on the lower surface of a top plate having an almost square shape in a planar view. An exhaust port valve seat 111b is formed on the lower end face of the exhaust cylinder 111. On the upper surface of the top plate of the upper housing 11, a cylindrical projection 112 stands in a position apart from the exhaust cylinder 111. A cylindrical discharge passage 113 stands on the upper end portion of the projection 112.

The rapid discharge valve 12 is a valve body entirely formed into a plate having an almost square shape in a planar view by an elastic material such as rubber. The rapid discharge valve 12 is integrally formed of an exhaust port valve body 121 formed in a position corresponding to the exhaust port valve seat 111b, a check valve body 122 formed in a position corresponding to the check valve seat 107, a connecting portion 123 formed between the exhaust port valve body 121 and check valve body 122 and connecting these elements, and a support portion 124 formed around the exhaust port valve body 121, check valve body 122, and connecting portion 123.

The exhaust port valve body 121 includes a disk-like exhaust port valve main body 121a which is selectively urged against the exhaust port valve seat 111b and the inner surface of the lower housing 10, and an exhaust port valve main body support portion 121b formed around the exhaust port valve main body 121a. The exhaust port valve main body 121a has rigidity by which no strain occurs when the exhaust port valve main body 121a is urged against the exhaust port valve seat 111b and lower housing 10, and is formed to be thicker than the exhaust port valve main body support portion 121b. The exhaust port valve main body support portion 121b is formed to have a curved section so as to bend easily.

The check valve body 122 is formed into a cylinder having the shape of a circular truncated cone projecting upward. The inner diameter of the opening of the upper bottom, i.e., the distal end is made equal to the outer shape of the check valve seat 107. On the other hand, the inner diameter of the opening of the lower bottom, i.e., the proximal end connected to the connecting portion 123 and support portion 124 is made larger than the outer shape of the check valve seat 107. The check valve body 122 forms a check valve as a flow rate controller together with the check valve seat 107, i.e., allows air to flow from the input-side space 9A to the output-side space 9B, and prevents air from flowing from the output-side space 9B to the input-side space 9A.

A communication hole 123a having an inner diameter larger than the outer diameter of the projection 108 of the lower housing 10 is formed in the connecting portion 123.

The rapid discharge valve 12 is placed on the upper surface of the top plate of the lower housing 10 in a state in which the check valve body 122 is inserted into the check valve seat 107 and the projection 108 is inserted into the communication hole 123a. In this state, the upper housing 11 is placed on the lower housing 10 with a compression coil spring 114 being elastically attached on the outer circumferential surface of the exhaust cylinder 111. The rapid discharge valve 12 is thus supported inside the vessel 9 in a state in which the support portion 124 is sandwiched between the upper-surface periphery of the top plate of the lower housing 10 and the sidewall lower end of the upper housing 11.

Consequently, the rapid discharge valve 12 partitions the interior of the vessel 9 into the input-side space 9A including the supply passage 106 and the output-side space 9B including the exhaust port 111a and discharge passage 113. The input-side space 9A and output-side space 9B communicate with each other through a communication passage 123b which is a gap between the communication hole 123a and projection 108. While the diaphragm pump 1 is not driven, the exhaust port valve main body 121a is urged against the upper surface of the lower housing 10 by the compression coil spring 114. In this state, the upper-bottom end portion of the check valve body 122 abuts against the open-end side surface of the check valve seat 107 of the lower housing 10, and the lower-bottom end portion is apart from the proximal-end side surface of the check valve seat 107.

The motor 3, case 4, diaphragm holder 6, diaphragm 7, partition 8, and rapid-discharge-valve structural body 2 are stacked in this order and integrated by fixing adjacent members with an adhesive or the like. Alternatively, these members are integrated by using, e.g., a spring which fixes the upper housing 11 by pressing it against the motor 3.

<Operation of Diaphragm Pump>

Next, the operation of the above-described diaphragm pump will be explained.

When the output shaft 3a rotates by driving by the motor 3 in the diaphragm pump according to this embodiment, the driving mechanism 5 causes the pistons 73 to vertically reciprocate, and the two diaphragm portions 71 alternately deform and the two pump chambers 70 alternately expand and contract.

When the pump chamber 70 expands, a negative pressure is set in the pump chamber 70, and air in the atmosphere is sucked into the pump chamber 70 from the inlet passage 104 through the suction space 103 and suction passage 82. On the other hand, when the pump chamber 70 contracts, the internal air pressure of the pump chamber 70 rises, so air in the pump chamber 70 is output through the output passage 81 to the supply space 105, and input from the supply passage 105 to the input-side space 9A in the vessel 9 of the rapid-discharge-valve structural body 2 through the supply passage 106.

Air input to the input-side space 9A enters the output-side space 9B through the communication passage 123b which is the gap between the communication hole 123a into which the projection 108 is inserted and the projection 108.

In this state, a pressure loss is generated because air passes through the communication passage 123b, so the internal pressure of the input-side space 9A becomes higher than that of the output-side space 9B. When the difference between the internal pressure of the input-side space 9A and that of the output-side space 9B becomes larger than the resilient force of the compression coil spring 114, the exhaust port valve body 121 closes the exhaust port valve seat 111b, thereby disconnecting the exhaust port 111a and discharge passage 113. Accordingly, air in the output-side space 9B is discharged from the discharge passage 113.

When the flow rate of air to be supplied from the diaphragm pump main body 1 to the rapid-discharge-valve structural body 2 is equal to or lower than a predetermined flow rate, the check valve body 122 maintains the state in which its distal end portion abuts against the circumferential surface of the check valve seat 107. That is, the thickness of the check valve body 122 is set such that the check valve including the check valve body 122 and check valve seat 107 is kept closed. Therefore, when the flow rate of air to be supplied from the diaphragm pump main body 1 to the rapid-discharge-valve structural body 2 is equal to or lower than the predetermined flow rate, only air passing through the communication passage 123b is discharged from the discharge passage 113.

If the flow rate of air to be supplied from the diaphragm pump main body 1 to the rapid-discharge-valve structural body 2 exceeds the predetermined flow rate, the air pressure exceeds the resilient force of the check valve body 122, and the distal end portion of the check valve body 122 moves away from the check valve seat 107, i.e., the check valve including the check valve body 122 and check valve seat 107 opens. Consequently, air supplied to the rapid-discharge-valve structural body 2 is input from the input-side space 9A to the output-side space 9B through the communication passage 123b and the gap formed between the check valve body 122 and check valve seat 107, and discharged from the discharge passage 113.

When the rotational speed of the motor 3 increases, the rate at which the pump chamber 70 repeats expansion and contraction increases, so the flow rate of air to be supplied to the input-side space 9A increases. As the air flow rate increases, the pressure to be applied to the distal end portion of the check valve body 122 rises, and the distal end portion of the check valve body 122 further moves away from the check valve seat 107. This increases the area of the gap between the check valve body 122 and check valve seat 107, thereby increasing the flow rate of air passing through the gap. As a consequence, the flow rate of air to be discharged from the discharge passage 113 also increases.

On the other hand, when the rotational speed of the motor 3 decreases, the flow rate of air to be supplied to the supply passage 106 decreases, so the pressure to be applied to the distal end portion of the check valve body 122 decreases, and the distal end portion of the check valve body 122 moves close to the check valve seat 107. This decreases the area of the gap between the distal end portion of the check valve body 122 and the check valve seat 107, thereby decreasing the flow rate of air passing through the gap. Consequently, the flow rate of air to be discharged from the discharge passage 113 decreases.

Figure 2:
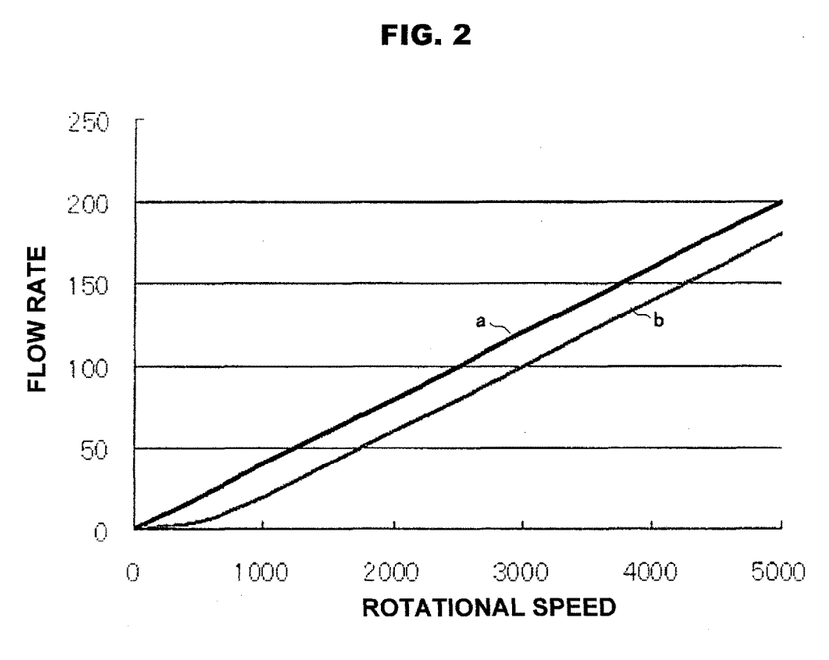
FIG. 2 is a graph showing the relationship between the rotational speed of a motor of the diaphragm pump shown in FIG. 1 and the flow rate of air to be discharged from a discharge port.

As described above, in the check valve as a flow rate controller including the check valve body 122 and check valve seat 107, the area of the gap formed between them changes in accordance with the rotational speed of the motor 3. Therefore, the flow rate of air to be discharged from the discharge passage 113 also changes in accordance with the rotational speed of the motor 3. That is, as shown in FIG. 2, the flow rate (symbol b) increases when the rotational speed (symbol a) of the motor 3 increases, and decreases when the rotational speed of the motor 3 decreases. This makes it possible to prevent flow rate peaking of air to be supplied from the discharge passage 113 to an object to be pressurized.

When the supply of air to the supply passage 106 is stopped by stopping the motor 3, the communication passage 123b decreases the difference between the internal pressure of the input-side space 9A and that of the output-side space 9B. Accordingly, the resilient force of the compression coil spring 114 pushes down the exhaust port valve body 121, so the exhaust port 111a and discharge passage 113 communicate with each other. As a consequence, the internal pressure of the output-side space 9B connected to the object to be pressurized through the discharge passage 113 becomes the atmospheric pressure.

In this embodiment as explained above, air flows from the input-side space 9A to the output-side space 9B in accordance with the flow rate of air to be supplied to the supply passage 106, so the flow rate of air to be discharged from the discharge passage 113 also changes. As a result, flow rate peaking can be prevented.

Note that this embodiment has been explained by taking, as an example, the case in which the compression coil spring 114 pushes down the exhaust port valve main body 121a toward the lower housing 10. However, the present invention is not limited to this, and the compression coil spring 114 need not be formed if the exhaust port valve main body support portion 121b is so formed as to push down the exhaust port valve main body 121a toward the lower housing 10.

Second Embodiment

In the first embodiment, the case in which the communication passage 123b is formed in the rapid discharge valve 12 has been explained. However, the place where the communication passage is formed is not limited to the rapid discharge valve 12, and can freely be set in any place such as the vessel 9. In the second embodiment shown in FIG. 3, a groove 115 as a communication passage is formed in a check valve seat 107 of a lower housing 10, instead of the projection 108 and communication hole 123a forming the communication passage 123b. The groove 115 is formed in the circumferential surface of the check valve seat 107 from an almost central portion to the distal end portion of the check valve seat 107 along the axial direction of the check valve seat 107. The groove 115 forms a gap together with the distal end portion of a check valve body 122 abutting against the circumferential surface of the check valve seat 107, and the gap functions as a communication passage. Even when the communication passage is formed in a vessel 9 as described above, the internal pressure of the input-side space 9A can communicate with the output-side space 9B.

<Independent Rapid-Discharge-Valve Structural Body>

In each of the first and second embodiments, the case in which the rapid-discharge-valve structural body is formed as a constituent element of the diaphragm pump has been explained. However, the rapid-discharge-valve structural body may also be formed independently of the diaphragm pump. In a rapid-discharge-valve structural body 2' shown in FIG. 4, the same constituent elements as those of the rapid-discharge-valve structural body 2 of the diaphragm pump shown in FIG. 1 are given the same names and the same reference numerals, and an explanation thereof will be omitted as needed.

Figure 4:
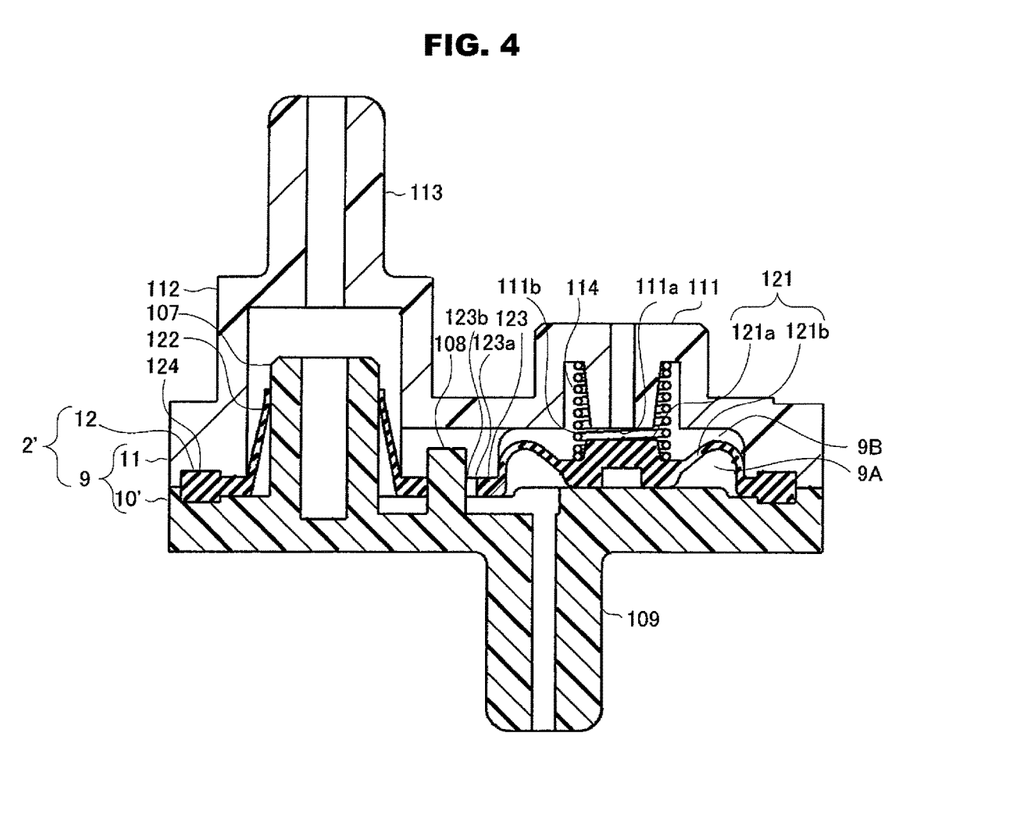
FIG. 4 is a sectional view when a rapid-discharge-valve structural body shown in FIG. 1 is an independent constituent element.

As shown in FIG. 4, the rapid-discharge-valve structural body 2' includes a vessel 9' including a lower housing 10' and upper housing 11, and a rapid discharge valve 12 accommodated in the vessel 9'.

A cylindrical supply passage 109 stands on an almost central portion of the lower surface of the lower housing 10'. A projection 108 and check valve seat 107 stand on the upper surface of the lower housing 10'.

In the rapid-discharge-valve structural body 2' having an independent arrangement as described above, air is supplied from the outside through the supply passage 109, and the supplied air is discharged from a discharge passage 113. In this case, the flow rate of air to be discharged from the discharge passage 113 changes in accordance with a flow rate supplied to the supply passage 109. This makes it possible to prevent flow rate peaking in the same manner as in the case of the diaphragm pump described above.

Figure 3:
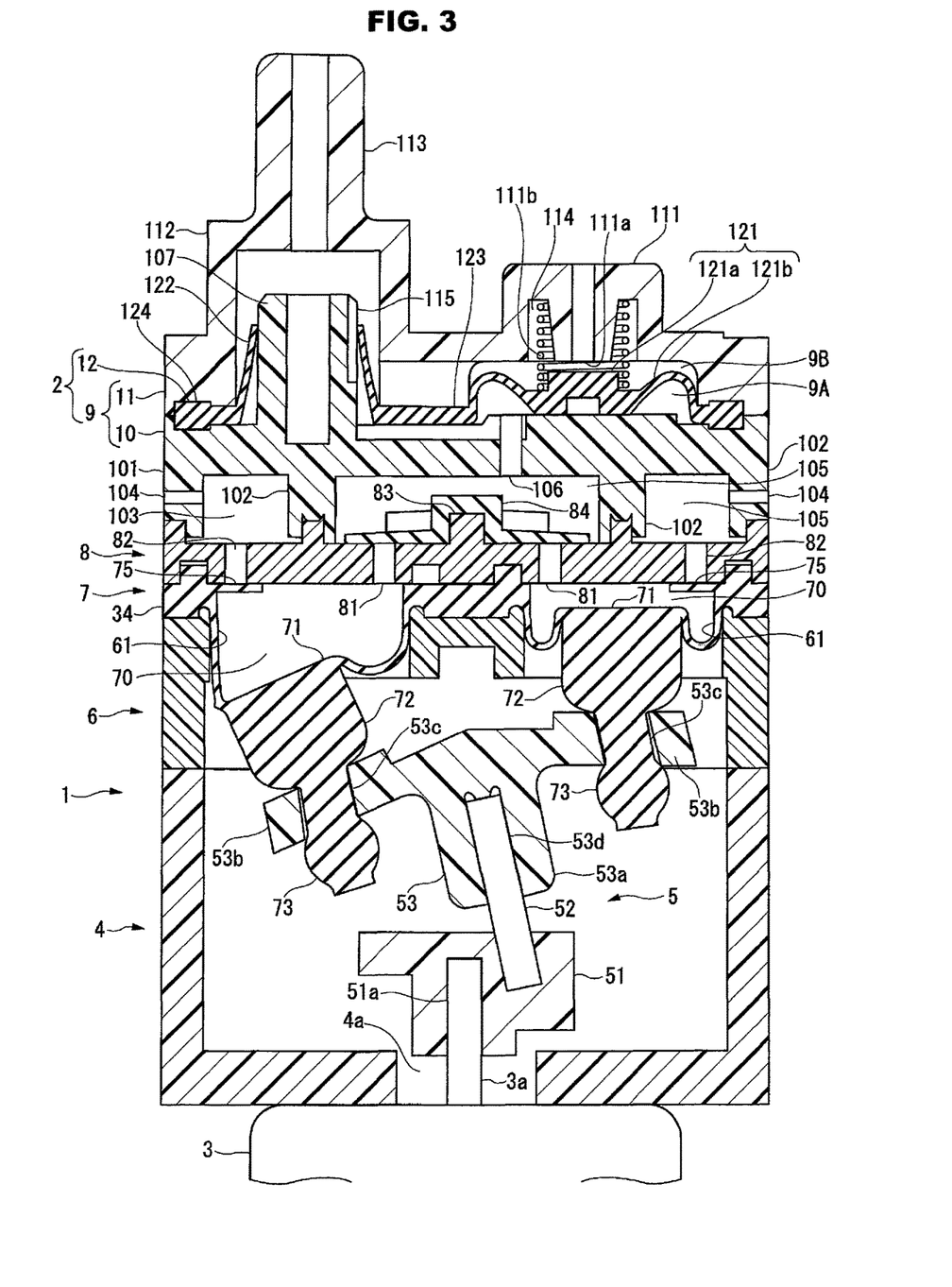
FIG. 3 is a sectional view of a diaphragm pump according to the second embodiment of the present invention.

Note that it is, of course, also possible to form the communication passage of the rapid-discharge-valve structural body 2' in the vessel in the same manner as in the case of the diaphragm pump shown in FIG. 3.

EXPLANATION OF THE REFERENCE NUMERALS AND SIGNS

1 . . . diaphragm pump main body, 2, 2' . . . rapid-discharge-valve structural body, 5 . . . driving mechanism, 6 . . . diaphragm holder, 7, 71 . . . diaphragm, 8 . . . partition, 9 . . . vessel, 9A . . . input-side space, 9B . . . output-side space, 12 . . . rapid discharge valve, 72 . . . diaphragm portion, 81 . . . output passage, 82 . . . suction passage, 107 . . . check valve seat, 109 . . . supply passage, 111a . . . exhaust port, 113 . . . discharge passage, 121 . . . exhaust port valve body, 122 . . . check valve body, 123b . . . communication passage.

The invention claimed is:

1. A rapid-discharge-valve structural body comprising:
   a vessel including a supply passage through which a gas is supplied from a source external to the rapid-discharge-valve structural body, a discharge passage configured to discharge the gas to an object to be pressurized, and an exhaust port configured to exhaust the gas in the vessel to the outside;
   a rapid discharge valve installed in the vessel, the rapid discharge valve including an exhaust port valve body configured to partition an internal space of the vessel into an input-side space including the supply passage and an output-side space including the discharge passage and the exhaust port, and close the exhaust port when a a gas is supplied through the supply passage into the input-side space;
   a communication passage configured to allow the input-side space and the output-side space to communicate with each other; and
   a flow rate controller configure to when a gas is supplied through the supply passage into the input-side space, allow the gas to flow from the input-side space to the output-side space in accordance with a flow rate of the gas to be supplied to the supply passage, and, when no gas is supplied through the supply passage into the input-side space, prevent a flow of a gas from the output-side space to the input-side space,
   wherein the flow rate controller comprises:
   a cylindrical check valve body having a truncated conical shape, the cylindrical check valve body integrated with the rapid discharge valve together with the exhaust port valve body, and supported at lower-bottom end portion thereof; and
   a columnar check valve seat standing in the input-side space toward the output-side space, and inserted into the check valve body, the columnar check valve seat having a distal-end circumferential surface abutting against an upper-bottom end portion of the check valve body, and a proximal-end circumferential surface apart from the lower-bottom end portion of the check valve body.

2. The rapid-discharge-valve structural body according to claim 1, wherein the communication passage comprises a projection projecting from the input-side space to the output-side space, and a communication hole which has an inner diameter larger than an outer diameter of the projection and with which the projection engages.

3. The rapid-discharge-valve structural body according to claim 1, wherein the communication passage comprises a groove formed in a circumferential surface of the check valve seat.

4. A diaphragm pump comprising:
   a pump chamber formed by a diaphragm including a diaphragm portion;
   a diaphragm holder configured to hold the diaphragm;
   a partition arranged on the diaphragm holder;
   a rapid-discharge-valve structural body arranged on the partition; and
   a driving mechanism configured to expand and contract the pump chamber by deforming the diaphragm portion, wherein the partition includes a suction passage configured to allow the pump chamber to suck a gas, and an output passage configured to output the gas from the pump chamber, the diaphragm holder, the partition, and the rapid-discharge-valve structural body are integrated in a stacked state, and the rapid-discharge-valve structural body comprises:

a vessel including a supply passage through which the gas output through the output passage is supplied, a discharge passage configured to discharge the gas to an object to be pressurized, and an exhaust port configured to exhaust an internal gas outside of the diaphragm pump;

a rapid discharge valve installed in the vessel, and including an exhaust port valve body configured to partition an internal space of the vessel into an input-side space including the supply passage and output-side space including the discharge passage and the exhaust port, and close the exhaust port when a gas is supplied through the supply passage into the input-side space;

a communication passage configured to allow the input-side space and the output-side space to communicate with each other, and a flow rate controller configured to, when a gas is supplied through the supply passage into the input-side space, allow the gas to flow from the input-side space to the output-side space in accordance with a flow rate of the gas to be supplied to the supply passage, and, when no gas is supplied through the supply passage into the input-side space, prevent a flow of a gas from the output-side space to the input-side space, wherein the flow rate controller comprises:

a cylindrical check valve body having a truncated conical shape, the cylindrical check valve body integrated with the rapid discharge valve together with the exhaust port valve body, and supported at lower-bottom end portion thereof; and a columnar check valve seat standing in the input-side space toward the output-side space, and inserted into the check valve body, the columnar check valve seat having a distal-end circumferential surface abutting against an upper-bottom end portion of the check valve body, and a proximal-end circumferential surface apart from the lower-bottom end portion of the check valve body.

5. The diaphragm pump according to claim 4, wherein the communication passage comprises a projection projecting from the input-side space to the output-side space, and a communication hole which has an inner diameter larger than an outer diameter of the projection and with which the projection engages.

6. The diaphragm pump according to claim 4, wherein the communication passage comprises a groove formed in a circumferential surface of the check valve seat.

\* \* \* \* \*